INVENTORS
GERALD D. HARRINGTON
HENRY G. SHAKESPEARE
BY Kenyon & Kenyon
ATTORNEYS

INVENTORS
GERALD D. HARRINGTON
HENRY G. SHAKESPEARE
BY
ATTORNEYS

United States Patent Office 3,143,315
Patented Aug. 4, 1964

3,143,315
STAR DRAG FOR FISHING REEL
Gerald D. Harrington and Henry G. Shakespeare, both of Richland, Mich., assignors to Shakespeare Company, Kalamazoo, Mich., a corporation of Michigan
Filed June 22, 1961, Ser. No. 118,923
5 Claims. (Cl. 242—84.45)

This invention relates to fishing reels and particularly to slip clutch mechanisms commonly known as star drags which permit line to be drawn through the reel through slippage of the clutch and particularly to star drag mechanisms for fixed spool reels.

One of the objects of the invention is to provide a new and improved star drag.

Another object is to provide such a star drag mechanism in which by manipulation of the reel crank it is possible to increase the friction while by releasing the crank the friction may be reduced.

Another object is to provide a star drag mechanism particularly suited for use in fixed spool reels which is compact and may be used in connection with conventional forms thereof without materially altering their size or appearance.

Other objects and advantages of the invention will be apparent from the following specification and drawings which form a part thereof, in which—

Figure 1:
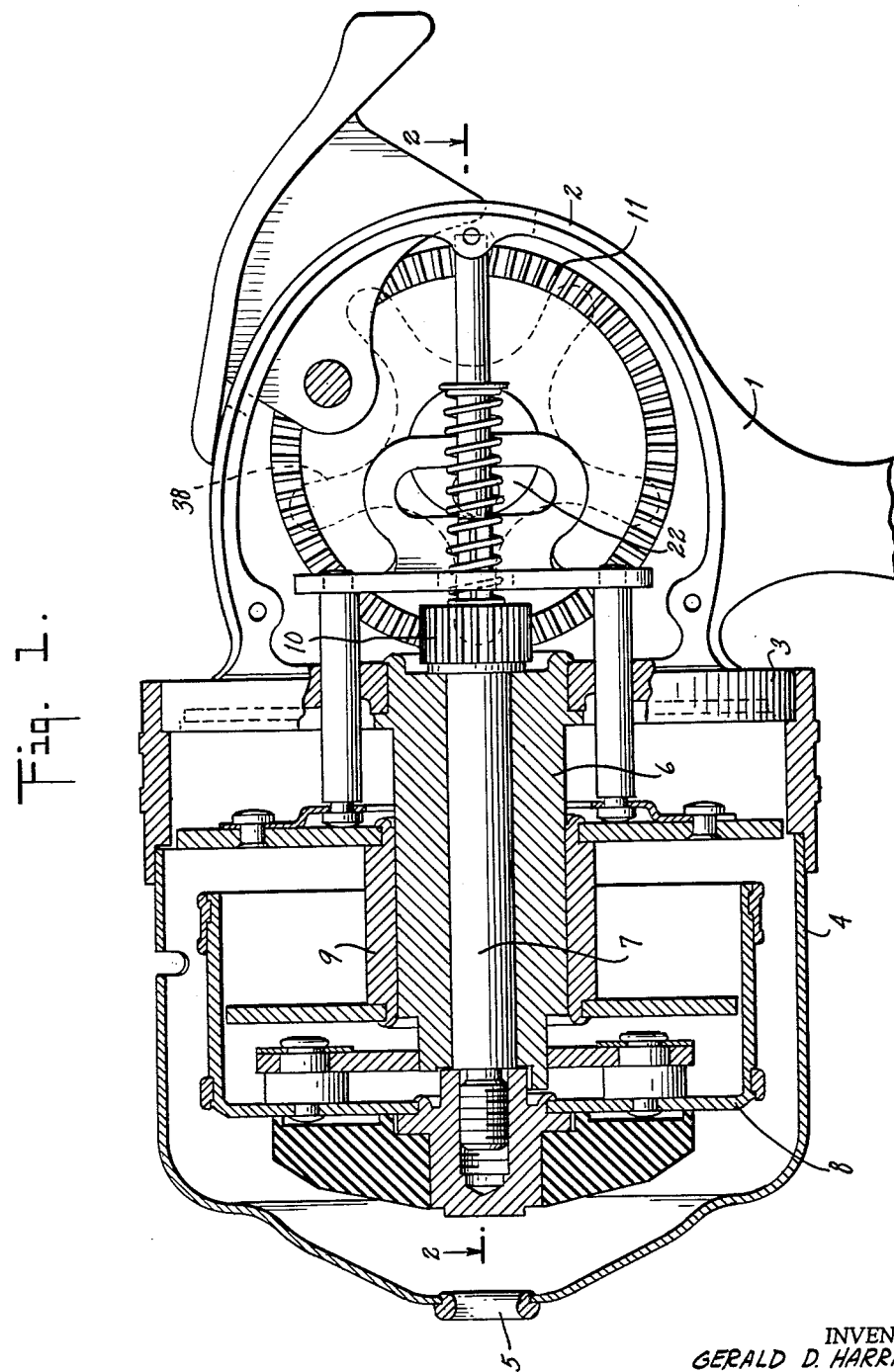
FIG. 1 is a sectional view of a reel embodying the invention.
Figure 2:
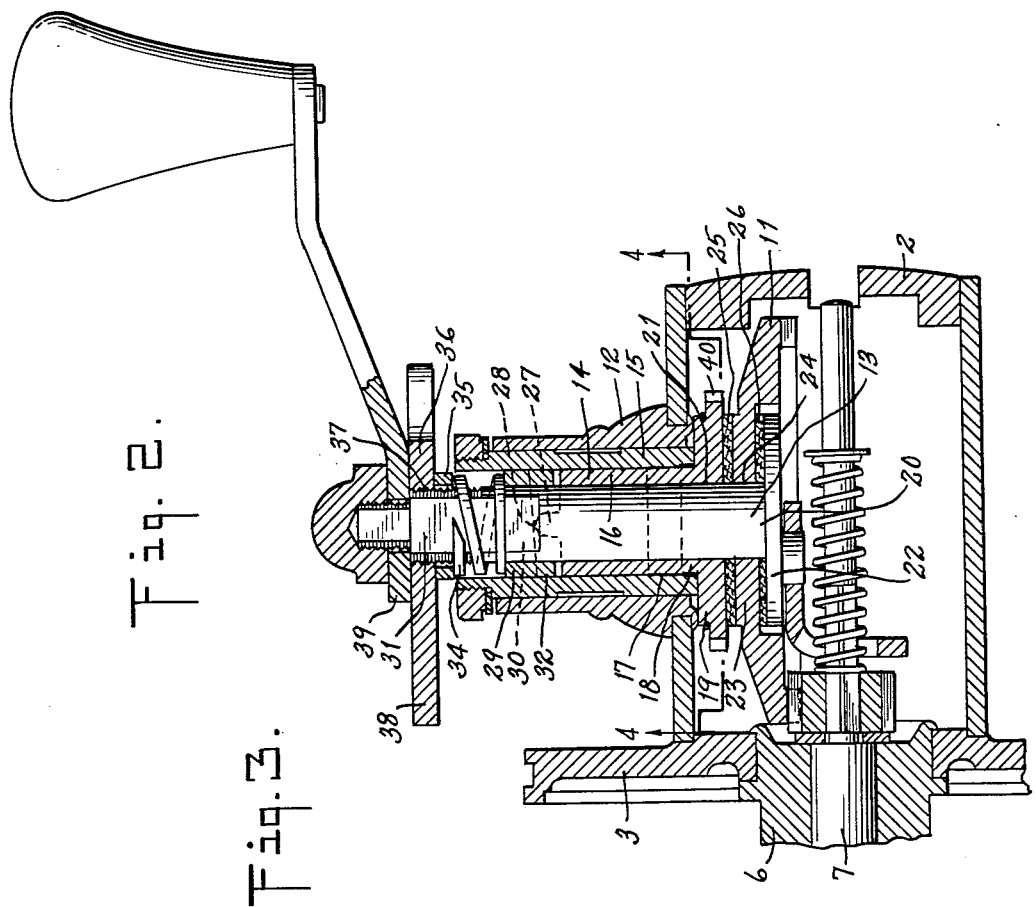
FIG. 2 is a sectional view of a portion of the mechanism shown in FIG. 1.
Figure 3:
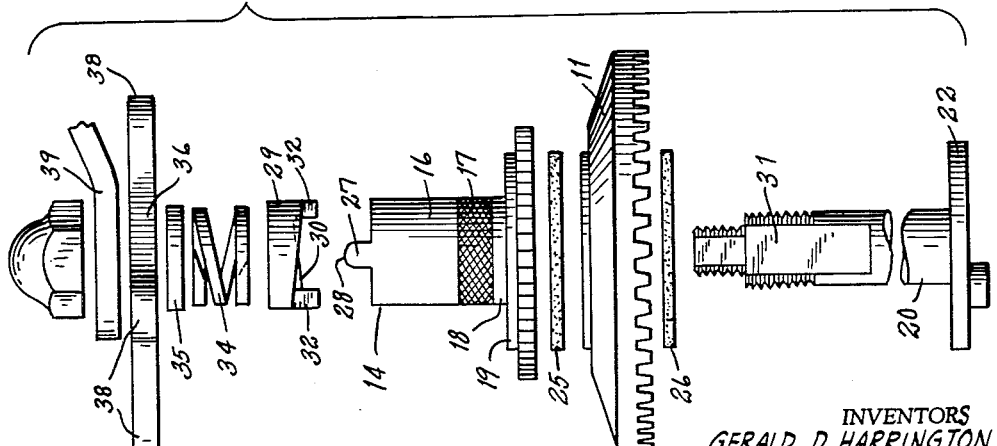
FIG. 3 is an exploded view showing the parts in disassembled relationship.

The reel shown in the drawings for the purpose of illustrating the invention is a form which is deemed satisfactory and which will give desirable results. It will be understood, however, that the form of the invention shown and described is illustrative only and that the invention is not limited to the specific form of reel described.

In general, the invention consists in providing a star drag mechanism in a fishing reel of the type in which a spooling member is rotated in proximity to a fixed spool by a shaft provided with a pinion, all of which is enclosed in a housing. The star drag mechanism comprises a tubular bearing opening into the housing and in the form of reel mentioned it extends perpendicular to the shaft which drives the spooling member.

A gear stem sleeve is rotatably mounted in the bearing with its inner end extending into the housing. At its inner end there is a flat disk perpendicular to the axis of the bearing.

A gear stem is mounted for rotation in the gear stem sleeve. Its inner end extends into the housing and carries a flat disk perpendicular to its axis lying parallel to and opposed to the first disk to provide slip clutch means.

A face gear having its teeth in engagement with the pinion and having a flat central portion generally coextensive with the disks is disposed therebetween. The central portion is apertured and fitted over the gear stem and frictional material is disposed between the disks and the flat central portion of the face gear.

The gear stem sleeve has thereon cam follower means with an outwardly facing face and stop means which extend generally axially of said sleeve.

There is a cam member slidably and non-rotatably disposed on the gear stem. It has an inwardly facing cam face which bears against the cam follower face and is adapted upon relative rotation between the cam member and the gear stem sleeve to control or impart axial movement to said gear stem sleeve and the gear stem.

Stop members are also provided on the cam member disposed to engage the stop means on the gear stem sleeve to limit relative rotation of the cam member and the gear stem sleeve.

A compression spring surrounding the gear stem bears against the cam member to hold the cam face thereof yieldingly against the cam follower. An adjusting nut is screw-threaded on the gear stem to adjustably compress the spring and its associated members to adjust the slip clutch means.

A crank is non-rotatably fixed on the other end of the gear stem and ratchet means are provided to permit rotation of the crank in a line retrieving direction but to prevent rotation thereof in the opposite direction.

These means in the preferred form of the invention comprise ratchet teeth on the gear stem sleeve, a pawl pivoted on the housing and means associated to lift the pawl out of engagement with the ratchet teeth when the crank is moved in a line retrieving direction.

The reel consists of a frame 1 having a housing 2, a supporting wall 3, a hood 4 which has an opening 5 therein for the line, and a suitable bearing and support 6 for the drive shaft 7 which carries a spooling member 8 which is rotated by said shaft and a spool 9 mounted thereon. These members are all conventional.

The shaft 7 is driven by a pinion 10 which meshes with a face gear 11.

The star drive mechanism is mounted in a bearing 12 which opens into said housing. Its axis 13 is perpendicular to the axis of the shaft 7.

A gear stem sleeve 14 comprising sections 15 and 16 which are press fitted together and secured by knurling indicated at 17, is rotatably mounted in the bearing 12. Its inner end 18 extends into the housing and a first flat disk 19 is supported thereby. This disk lies perpendicular to the axis of the bearing. A gear stem 20 is mounted for rotary movement in the bore 21 of the gear stem sleeve. Its inner end extends into the housing and carries a flat disk 22 which is perpendicular to the axis of the gear stem sleeve and lies parallel to and opposed to the first disk 19 to provide slip clutch means.

The face gear 11 has a flat central portion 23 generally coextensive with the disks 19 and 22 and which is disposed therebetween. It is provided with a central aperture 24 fitted over the gear stem. Frictional material disks 25 and 26 are disposed between the disks and the flat central portion of the face gear.

The gear stem sleeve 14 carries upwardly projecting lugs 27 which constitute cam followers and stops extending generally axially of said sleeve. The outer face 28 of the lug constitutes a cam follower face.

Cam means 29 are provided slidably mounted on said gear stem. These cam means have a central aperture with a flattened side 30 and fit over the outer end of the gear stem 20 which has its sides flattened at 31 to hold the cam member against rotation on the sleeve. The cam member carries a pair of downwardly facing lugs 32 which serve as stop means to engage the lugs 27 to limit relative rotation between the cam members and the gear stem sleeve. The cam member has sloping cam faces adapted to engage the cam follower faces 28 to control relative axial movement between the cam member and the gear stem sleeve on relative rotation thereof. These faces are so disposed that on rotation of the gear stem in a line retrieving direction, the cam surfaces will tend to increase the gripping action of the disks on the gear 11, thus increasing resistance to slippage, and by the same token to reverse movement of the gear stem to reduce the friction.

A compression spring 34 surrounds the gear stem. It bears at its lower end against the cam member and at its upper end against a sleeve 35 which bears against a nut 36 which is threaded as indicated at 37 on the gear stem to control the resilient clamping action of the disks. The nut 36 has the usual arms 38 which are conventional in star drag mechanisms. A crank 39 is non-rotatably secured to the outer end of the gear stem.

Figure 4:
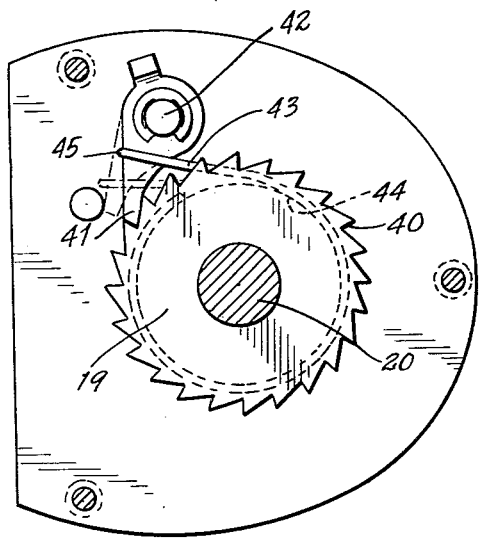
FIG. 4 is a view taken along the line 4, 4 of FIG. 2.
Figure 5:
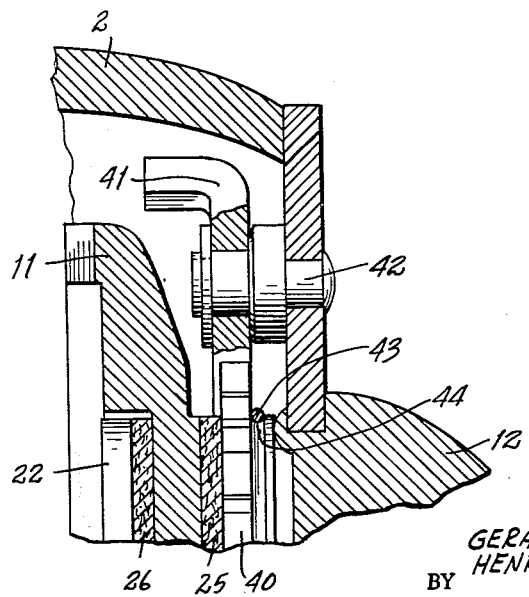
FIG. 5 is a detailed sectional view showing the pawl mechanism.

Ratchet means are provided for preventing backward rotation of the crank while permitting free rotation thereof in the opposite or line retrieving direction. These comprise ratchet teeth 40 cut in the outer periphery of the disk 19 and a pawl 41 pivoted on stud 42 on the housing for movement from the full line position shown in FIG. 4 to the dotted line position. When the pawl is in the dotted line position, forward or line retrieving motion of the crank is permitted.

Means are provided for controlling the pawl. These consist of a spring 43 which is generally circular in form and is sealed in a groove 44 in disk 19 adjacent ratchet teeth 40. One end 45 which points in a direction of line retrieving rotation extends tangentially and is looped around the pawl 41. When there is movement in the line retrieving direction, rotation of the gear stem sleeve which is counterclockwise in FIG. 4, moves the pawl to the dotted line position permitting free and noiseless line retrieving. A slight movement in the reverse or counter-clockwise direction will cause the spring 44 to pull the pawl into the full line position, stopping rotation in the reverse direction.

In the operation of the reel the drive is from the crank to the pinion 10 through the face gear 11. The adjusting nut 36 is adjusted so as to impart frictional drive to the face gear when the crank is rotated. This tends to increase the frictional contact between the disks 19 and 22 and the face gear 11 because rotation of the gear stem tends to rotate the cam member and thus tends to pull the gear stem outwardly and the disk 22 into closer contact with the disk 19.

Although there is frictional contact to drive the gear 11 when the parts are so adjusted, the manipulation of the crank in the line retrieving direction tends to increase this friction and offer greater resistance to any pull on the line tending to pull it from the reel.

Relative movement between the cam member and the gear stem in a rotational direction is limited by the stop means, but there is enough movement to give an increased friction. However, when the crank is released the action of the spring will tend to reduce the friction by relative movement between the cam member and the cam follower on the gear stem sleeve.

The amount of friction may be adjusted through the nut 36 in the usual manner, but the manipulation of the crank will thus tend to increase the friction, while releasing the crank will tend to reduce the friction.

This is significant when a fish is on the line and tends to pull line from the reel. The fisherman may release the handle, thus slightly reducing the friction.

The pawl mechanism will on release on the handle prevent movement in a backward direction to any great extent.

The mechanism above described is simple, inexpensive and effective. It may be incorporated in standard reels of any type with the above enumerated advantages flowing from it. It is particularly well adapted for use in fixed spool reels and can be incorporated without interfering with the normal functional operation or appearance.

The present invention may be embodied in forms other than that described above without departing from the spirit or essential attributes of the invention. It is, therefore, desired that the present embodiment described above be considered in all respects as illustrative, not restrictive, reference being had to the appended claims rather than to the foregoing description to indicate the scope of the invention.

We claim:

1. In a fishing reel of the type in which a spooling member is rotated in proximity to a fixed spool by a shaft having a pinion thereon enclosed in a housing, the improvement comprising an adjustable drive and drag comprising a tubular bearing opening into said housing with its axis perpendicular to said shaft, a gear stem sleeve rotatably mounted in said bearing and having an inner end extending into said housing and having at its inner end a first flat disk lying perpendicular to the axis of said bearing, a gear stem mounted for rotary movement in said gear stem sleeve having an outer end and an inner end in said housing and at said inner end a flat disk perpendicular to the axis of said gear stem sleeve and lying parallel to and opposed to said first disk to provide slip clutch means, a face gear having teeth in engagement with said pinion and having a flat central portion generally coextensive with said disks and disposed therebetween and having a central aperture fitted over said gear stem, frictional material disposed between said disks and the central portion of said face gear, cam follower means on said gear stem sleeve having a face thereon facing outwardly of said housing and stop means on said gear stem sleeve extending generally axially thereof, a cam member slidably and non-rotatably disposed on said gear stem and having an inwardly facing cam face bearing on said cam follower face and adapted upon relative rotation of said cam member and said gear stem sleeve to control relative axial movement of said gear stem sleeve and said gear stem, stop members on and extending generally axially of said cam member disposed to engage the stop means on said gear stem sleeve on relative rotation of said cam member and said gear stem sleeve to limit such rotation, a compression spring bearing against said cam member to hold the cam face thereof yielding against said cam follower, an adjusting nut screw-threaded on said gear stem in operative engagement with and disposed to adjustably compress said spring and its associated members to adjust the slip clutch means, and a crank non-rotatably fixed on the outer end of said gear stem and ratchet means associated with said gear stem sleeve permitting rotation of said crank in line retrieving direction and preventing rotation thereof counter thereto comprising ratchet teeth on said gear stem sleeve, a pawl pivoted on said housing and means associated with said gear stem sleeve to lift said pawl out of engagement with said ratchet teeth on line retrieving movement of said crank.

2. In a fishing reel of the type in which a spooling member is rotated in proximity to a fixed spool by a shaft having a pinion thereon enclosed in a housing, the improvement comprising an adjustable drive and drag comprising a tubular bearing opening into said housing with its axis perpendicular to said shaft, a gear stem sleeve rotatably mounted in said bearing and having an inner end extending into said housing and having at its inner end a first flat disk lying perpendicular to the axis of said bearing, a gear stem mounted for rotary movement in said gear stem sleeve having an outer end and an inner end in said housing and at said inner end a flat disk perpendicular to the axis of said gear stem sleeve and lying parallel to and opposed to said first disk to provide slip clutch means, a face gear having teeth in engagement with said pinion and having a flat central portion generally coextensive with said disks and disposed therebetween and having a central aperture fitted over said gear stem, friction material disposed between said disks and the central portion of said face gear, cam follower means on said gear stem sleeve having a face thereon facing outwardly of said housing and stop means on said gear stem sleeve extending generally axially thereof, a cam member slidably and non-rotatably disposed on said gear stem and having an inwardly facing cam face bearing on said cam follower face and adapted upon relative rotation of said cam member and said gear stem sleeve to control relative axial movement of said gear stem sleeve and said gear stem, stop members on and extending generally axially of said cam member disposed to engage the stop means on said gear stem sleeve on relative rotation of said cam member and said gear stem sleeve to limit such rotation, a compression spring bearing against said cam member to hold the cam face thereof yielding against said cam follower, an adjusting nut screw-threaded on said gear stem in operative engagment with and disposed to adjustably compress said spring and its associated members to adjust the slip clutch means, and a crank non-rotatably fixed on the outer end of said gear stem and ratchet means associated with said gear stem sleeve permitting rotation of said crank in line retrieving direction and preventing rotation thereof counter thereto.

3. In a fishing reel of the type in which a spooling member is rotated in proximity to a fixed spool by a shaft having a pinion thereon enclosed in a housing, the improvement comprising an adjustable drive and drag comprising a tubular bearing opening into said housing with its axis perpendicular to said shaft, a gear stem sleeve rotatably mounted in said bearing and having an inner end extending into said housing and having at its inner end a first flat disk lying perpendicular to the axis of said bearing, a gear stem mounted for rotary movement in said gear stem sleeve having an outer end and an inner end in said housing and at said inner end a flat disk perpendicular to the axis of said gear stem sleeve and lying parallel to and opposed to said first disk to provide slip clutch means, a face gear having teeth in engagement with said pinion and having a flat central portion generally coextensive with said disks and disposed therebetween and having a central aperture fitted over said gear stem, friction material disposed between said disks and the central portion of said face gear, cam follower means on said gear stem sleeve having a face thereon facing outwardly of said housing, a cam member slidably and non-rotatably disposed on said gear stem and having an inwardly facing cam face bearing on said cam follower face and adapted upon relative rotation of said cam member and said gear stem sleeve to control relative axial movement of said gear stem sleeve and said gear stem, a compression spring bearing against said cam member to hold the cam face thereof yielding against said cam follower, an adjusting nut screw-threaded on said gear stem in operative engagement with and disposed to adjustably compress said spring to adjust the slip clutch means, and a crank non-rotatably fixed on the outer end of said gear stem and ratchet means associated with said gear stem sleeve permitting rotation of said crank in line retrieving direction and preventing rotation thereof counter thereto.

4. In a fishing reel a housing, the improvement comprising an adjustable drive and drag comprising a tubular bearing opening into said housing, a gear stem sleeve rotatably mounted in said bearing and having an inner end extending into said housing and having at its inner end a first flat disk lying perpendicular to the axis of said bearing, a gear stem mounted for rotary movement in said gear stem sleeve having an outer end and an inner end in said housing and at said inner end a flat disk perpendicular to the axis of said gear stem sleeve and lying parallel to and opposed to said first disk to provide slip clutch means, a gear having a flat central portion generally coextensive with said disks and disposed therebetween and having a central aperture fitted over said gear stem, friction material disposed between said disks and the central portion of said gear, cam follower means on said gear stem sleeve having a face thereon facing outwardly of said housing and stop means on said gear stem sleeve extending generally axially thereof, a cam member slidably and non-rotatably disposed on said gear stem and having an inwardly facing cam face bearing on said cam follower face and adapted upon relative rotation of said cam member and said gear stem sleeve to control relative axial movement of said gear stem sleeve and said gear stem, stop members on and extending generally axially of said cam member disposed to engage the stop means on said gear stem sleeve on relative rotation of said cam member and said gear stem sleeve to limit such rotation, a compression spring bearing against said cam member to hold the cam face thereof yielding against said cam follower, an adjusting nut screw-threaded on said gear stem in operative engagement with and disposed to adjustably compress said spring and its associated members to adjust the slip clutch means, and a crank non-rotatably fixed on the outer end of said gear stem and ratchet means associated with said gear stem sleeve permitting rotation of said crank in line retrieving direction and preventing rotation thereof counter thereto.

5. In a fishing reel a housing, the improvement comprising an adjustable drive and drag comprising a tubular bearing opening into said housing, a gear stem sleeve rotatably mounted in said bearing and having an inner end extending into said housing and having at its inner end a first flat disk lying perpendicular to the axis of said bearing, a gear stem mounted for rotary movement in said gear stem sleeve having an outer end and an inner end in said housing and at said inner end a flat disk perpendicular to the axis of said gear stem sleeve and lying parallel to and opposed to said first disk to provide slip clutch means, a gear having a flat central portion generally coextensive with said disks and disposed therebetween and having a central aperture fitted over said gear stem, friction material disposed between said disks and the central portion of said gear, cam follower means on said gear stem sleeve having a face thereon facing outwardly of said housing, a cam member slidably and non-rotatably disposed on said gear stem and having an inwardly facing cam face bearing on said cam follower face and adapted open relative rotation of said cam member and said gear stem sleeve to control relative axial movement of said gear stem sleeve and said gear stem, a compression spring bearing against said cam member to hold the cam face thereof yielding against said cam follower, an adjusting nut screw-threaded on said gear stem in operative engagement with and disposed to adjustably compress said spring to adjust the slip clutch means and a crank non-rotatably fixed on the outer end of said gear stem and ratchet means comprising ratchet teeth on said gear stem sleeve, a pawl pivoted on said housing and means associated with said gear stem sleeve to lift said pawl out of engagement with said ratchet teeth on line retrieving movement of said crank.

References Cited in the file of this patent

UNITED STATES PATENTS

| 2,162,774 | Coxe | June 20, 1939 |
| 2,896,874 | Nurmse | July 28, 1959 |
| 2,977,064 | Logan | Mar. 28, 1961 |
| 2,977,065 | Holahan | Mar. 28, 1961 |
| 3,025,020 | Sarah | Mar. 13, 1962 |

FOREIGN PATENTS

| 589,703 | France | Feb. 26, 1925 |

OTHER REFERENCES

Lehmann, German application 1,073,794, printed Jan. 21, 1960 (Kl. 45h 89/00).